United States Patent [19]

Ohsone et al.

[11] Patent Number: 4,916,655
[45] Date of Patent: Apr. 10, 1990

[54] METHOD AND APPARATUS FOR RETRIEVAL OF A SEARCH STRING

[75] Inventors: Tadashi Ohsone; Akira Yamamoto; Hiroyuki Kitajima, all of Yokohama; Masashi Tsuchida, Tokyo; Nobuhiro Taniguchi; Yoshiaki Yamashita, both of Hadano, all of Japan

[73] Assignee: Hitachi, Ltd., Tokyo, Japan

[21] Appl. No.: 13,049

[22] Filed: Feb. 10, 1987

[30] Foreign Application Priority Data

Feb. 14, 1986 [JP] Japan .................................. 61-28808
Mar. 12, 1986 [JP] Japan .................................. 61-52439

[51] Int. Cl.⁴ .............................................. G06F 15/40
[52] U.S. Cl. .................................... 364/900; 364/956;
364/956.1; 364/974.6
[58] Field of Search ... 364/200 MS File, 900 MS File

[56] References Cited

U.S. PATENT DOCUMENTS 4,218,760  8/1980  Levy .................................... 364/900
4,339,806  7/1982  Yoshida ............................. 364/900
4,464,718  8/1984  Dixon et al. ........................ 364/200

OTHER PUBLICATIONS

"Hardware Systems for Text Information Retrieval", by L. A. Hollaar, ACM SIGIR 6th Conf., 1983.
"Fast Pattern Matching in Strings", by D. E. Kunuth et al., SIAM J Comput., vol. 6, pp. 323-350, 1977.
"A Fast String Searching Algorithm", by R. S. Boyer et al., CACM, vol. 20, pp. 762-772, 1977.

Primary Examiner—Gareth D. Shaw
Assistant Examiner—Christine M. Eakman
Attorney, Agent, or Firm—Antonelli, Terry & Wands

[57] ABSTRACT

A skip table is prepared from which a state of a subsequent symbol string and an address of one or plural symbols to be subsequently inputted can be readily determined by making reference to a set of a current symbol string search state and one or plural symbols to be subsequently inputted of the symbol string. When executing searching for the symbol string, data stored in the skip table are looked up to assure the symbol string search by inputting only a minimized number of necessary characters of the symbol string. Necessity of inputting all the characters of the symbol string for searching is eliminated and the processing speed can be increased considerably. A plurality of symbol strings may be searched for.

4 Claims, 15 Drawing Sheets

FIG. 7

TABLE S(l,z) ~200

| l\z | A | B | C | OTHERS |
|---|---|---|---|---|
| 0 | -1 | 3 | 2 | 11 |
| 1 | -1 | -1 | 2 | 11 |
| 2 | 6 | -1 | -1 | 11 |
| 3 | 12 | -1 | 12 | 12 |
| 4 | -1 | 13 | 13 | 13 |
| 5 | -1 | 14 | 14 | 14 |
| 6 | -1 | -1 | 11 | 11 |
| 7 | 12 | 12 | -1 | 12 |
| 8 | 13 | -1 | 13 | 13 |
| 9 | -1 | 14 | 14 | 14 |
| 10 | -1 | 15 | 15 | 15 |

FIG. 6

TABLE H(l,z) ~201

| l\z | A | B | C | OTHERS |
|---|---|---|---|---|
| 0 | 10 | 8 | 9 | 0 |
| 1 | 7 | 1 | 10 | 1 |
| 2 | 7 | 2 | 6 | 2 |
| 3 | 2 | 6 | 2 | 2 |
| 4 | 6 | 2 | 2 | 2 |
| 5 | 6 | 2 | 2 | 2 |
| 6 | 6 | 6 | 6 | 6 |
| 7 | 6 | 6 | 6 | 6 |
| 8 | 6 | 6 | 6 | 6 |
| 9 | 6 | 6 | 6 | 6 |
| 10 | 6 | 6 | 6 | 6 |

FIG. 8

TEXT TABLE T(i)

| i | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|----|----|----|----|----|----|----|----|----|----|----|----|----|----|----|----|
| T(i) | A | A | B | C | A | A | B | A | B | A | A | B | C | B | A | A | B | B | A | A | A | B | A | A |

FIG. 9

| CYCLE | 0 | 1 | 2 | 3 | 4 | 5 |
|---|---|---|---|---|---|---|
| Z = T(i) |  | A | B | A | A | B |
| y = S(ℓ,z) |  | -1 | 11 | -1 | -1 | 11 |
| i | 11 | 10 | 21 | 20 | 19 | 30 |
| ℓ | 0 | 1 | 0 | 1 | 2 | 0 |

FIG. 14

| STATE NUMBER | STATE |
|---|---|
| 00 |  |
| 01 | W |
| 02 | O W |
| 03 | L |
| 04 | U L |
| 05 | B U L |
| 06 | T |
| 07 | A T |
| 08 | C A T |
| 09 | C A T T |
| 0A | C A T T L |
| FD | C A T T L E |
| FE | B U L L |
| FF | C O W |

FIG. 16

STATE TRANSITION TABLE L(ℓ,z)

| ℓ\z | A | B | C | E | L | O | T | U | W | OTHERS |
|---|---|---|---|---|---|---|---|---|---|---|
| 00 |   |   |   |   | 03 |   | 06 |   | 01 |   |
| 01 |   |   |   |   |   | 02 |   |   |   |   |
| 02 |   |   | FF |   |   |   |   |   |   |   |
| 03 |   |   |   |   |   |   |   | 04 |   |   |
| 04 |   | 05 |   |   |   |   |   |   |   |   |
| 05 |   |   |   |   | FE |   |   |   |   |   |
| 06 | 07 |   |   |   |   |   |   |   |   |   |
| 07 |   |   | 08 |   |   |   |   |   |   |   |
| 08 |   |   |   |   |   |   |   | 09 |   |   |
| 09 |   |   |   |   | 0A |   |   |   |   |   |
| 0A |   |   |   | FD |   |   |   |   |   |   |
| FD |   |   |   |   | 03 |   | 06 |   | 01 |   |
| FE |   |   |   |   | 03 |   | 06 |   | 01 |   |
| FF |   |   |   |   | 03 |   | 06 |   | 01 |   |

"00" IS PRESENTED BY BLANK

FIG. 17

SKIP TABLE S($\ell$,z)

| $\ell$ \ z | A | B | C | E | L | O | T | U | W | OTHERS |
|---|---|---|---|---|---|---|---|---|---|---|
| 00 | 1 | 2 | 2 | 3 | -1 | 1 | -1 | 1 | -1 | 3 |
| 01 | 4 | 4 | 4 | 4 | 4 | -1 | 4 | 4 | 4 | 4 |
| 02 | 5 | 5 | 5 | 5 | 5 | 5 | 5 | 5 | 5 | 5 |
| 03 | 4 | 4 | 4 | 4 | 4 | 4 | 4 | -1 | 4 | 4 |
| 04 | 5 | 3 | 5 | 5 | 5 | 5 | 5 | 5 | 5 | 5 |
| 05 | 3 | 2 | 2 | 3 | 3 | 3 | 3 | 3 | 3 | 3 |
| 06 | -1 | 4 | 4 | 4 | 4 | 4 | 4 | 4 | 4 | 4 |
| 07 | 5 | 5 | 3 | 5 | 5 | 5 | 5 | 5 | 5 | 5 |
| 08 | 3 | 2 | 2 | 3 | 3 | 3 | 1 | 3 | 3 | 3 |
| 09 | 3 | 2 | 2 | 3 | 1 | 3 | 3 | 3 | 3 | 3 |
| 0A | 3 | 2 | 2 | 3 | 3 | 3 | 3 | 3 | 3 | 3 |
| FD | 1 | 2 | 2 | 3 | -1 | 1 | -1 | 1 | -1 | 3 |
| FE | 1 | 2 | 2 | 3 | -1 | 1 | -1 | 1 | -1 | 3 |
| FF | 1 | 2 | 2 | 3 | -1 | 1 | -1 | 1 | -1 | 3 |

FIG. 18

STATE TRANSITION TABLE $L(l, z)$

| | 00 | 01 | ... | (A)C1 | (B)C2 | (C)C3 | ... | (E)C5 | (L)D3 | ... | (O)D6 | ... | (T)E3 | (U)E4 | ... | (W)E6 | ... | FF |
|---|---|---|---|---|---|---|---|---|---|---|---|---|---|---|---|---|---|---|
| 00 | 00 | 00 | 00 | 00 | 00 | 00 | 00 | 00 | 03 | 00 | 00 | 00 | 06 | 00 | 00 | 01 | 00 | 00 |
| 01 | 00 | 00 | 00 | 00 | 00 | 00 | 00 | 00 | 00 | 00 | 00 | 00 | 00 | 00 | 00 | 00 | 00 | 00 |
| 02 | 00 | 00 | 00 | 00 | 00 | FF | 00 | 00 | 00 | 00 | 02 | 00 | 00 | 00 | 00 | 00 | 00 | 00 |
| 03 | 00 | 00 | 00 | 00 | 00 | 00 | 00 | 00 | 00 | 00 | 00 | 00 | 00 | 04 | 00 | 00 | 00 | 00 |
| 04 | 00 | 00 | 00 | 00 | 05 | 00 | 00 | 00 | 00 | 00 | 00 | 00 | 00 | 00 | 00 | 00 | 00 | 00 |
| 05 | 00 | 00 | 00 | 00 | 00 | 00 | 00 | 00 | FE | 00 | 00 | 00 | 00 | 00 | 00 | 00 | 00 | 00 |
| 06 | 00 | 00 | 00 | 07 | 00 | 00 | 00 | 00 | 00 | 00 | 00 | 00 | 00 | 00 | 00 | 00 | 00 | 00 |
| 07 | 00 | 00 | 00 | 00 | 00 | 08 | 00 | 00 | 00 | 00 | 00 | 00 | 09 | 00 | 00 | 00 | 00 | 00 |
| 08 | 00 | 00 | 00 | 00 | 00 | 00 | 00 | FD | 00 | 00 | 00 | 00 | 00 | 00 | 00 | 00 | 00 | 00 |
| 09 | 00 | 00 | 00 | 00 | 00 | 00 | 00 | 00 | 0A | 00 | 00 | 00 | 00 | 00 | 00 | 00 | 00 | 00 |
| 0A | 00 | 00 | 00 | 00 | 00 | 00 | 00 | 00 | 00 | 00 | 00 | 00 | 00 | 00 | 00 | 00 | 00 | 00 |
| ... | 00 | 00 | 00 | 00 | 00 | 00 | 00 | 00 | 00 | 00 | 00 | 00 | 00 | 00 | 00 | 00 | 00 | 00 |
| FD | 00 | 00 | 00 | 00 | 00 | 00 | 00 | 00 | 03 | 00 | 00 | 00 | 06 | 00 | 00 | 01 | 00 | 00 |
| FE | 00 | 00 | 00 | 00 | 00 | 00 | 00 | 00 | 03 | 00 | 00 | 00 | 06 | 00 | 00 | 01 | 00 | 00 |
| FF | 00 | 00 | 00 | 00 | 00 | 00 | 00 | 00 | 03 | 00 | 00 | 00 | 06 | 00 | 00 | 01 | 00 | 00 |

FIG. 19

SKIP TABLE S(ℓ,z)

| | 00 | 01 | ... | (A) C1 | (B) C2 | (C) C3 | ... | (E) C5 | ... | (L) D3 | ... | (O) D6 | ... | (T) E3 | (U) E4 | ... | (W) E6 | ... | FF |
|---|---|---|---|---|---|---|---|---|---|---|---|---|---|---|---|---|---|---|---|
| 00 | 03 | 03 | 03 | 01 | 02 | 02 | 03 | 03 | 03 | FF | 03 | 01 | 03 | FF | 01 | 03 | FF | 03 | 03 |
| 01 | 04 | 04 | 04 | 04 | 04 | 04 | 04 | 04 | 04 | 04 | 04 | FF | 04 | 04 | 04 | 04 | 04 | 04 | 04 |
| 02 | 05 | 05 | 05 | 05 | 05 | 05 | 05 | 05 | 05 | 05 | 05 | 05 | 05 | 05 | 05 | 05 | 05 | 05 | 05 |
| 03 | 04 | 04 | 04 | 04 | 04 | 04 | 04 | 04 | 04 | 04 | 04 | 04 | 04 | 04 | FF | 04 | 04 | 04 | 04 |
| 04 | 05 | 05 | 05 | 05 | 03 | 05 | 05 | 05 | 05 | 05 | 05 | 05 | 05 | 05 | 05 | 05 | 05 | 05 | 05 |
| 05 | 03 | 03 | 03 | 03 | 02 | 02 | 03 | 03 | 03 | 03 | 03 | 03 | 03 | 03 | 03 | 03 | 03 | 03 | 03 |
| 06 | 04 | 04 | 04 | FF | 04 | 04 | 04 | 04 | 04 | 04 | 04 | 04 | 04 | 04 | 04 | 04 | 04 | 04 | 04 |
| 07 | 05 | 05 | 05 | 05 | 05 | 05 | 05 | 05 | 05 | 05 | 05 | 05 | 05 | 05 | 05 | 05 | 05 | 05 | 05 |
| 08 | 03 | 03 | 03 | 03 | 02 | 02 | 03 | 03 | 03 | 01 | 03 | 03 | 03 | 01 | 03 | 03 | 03 | 03 | 03 |
| 09 | 03 | 03 | 03 | 03 | 02 | 02 | 03 | 03 | 03 | 03 | 03 | 03 | 03 | 03 | 03 | 03 | 03 | 03 | 03 |
| 0A | 03 | 03 | 03 | 03 | 02 | 02 | 03 | 03 | 03 | 03 | 03 | 03 | 03 | 03 | 03 | 03 | 03 | 03 | 03 |
| ... | 03 | 03 | 03 | 03 | 03 | 03 | 03 | 03 | 03 | 03 | 03 | 03 | 03 | 03 | 03 | 03 | 03 | 03 | 03 |
| FD | 03 | 03 | 03 | 01 | 02 | 02 | 03 | 03 | 03 | FF | 03 | 01 | 03 | FF | 01 | 03 | FF | 03 | 03 |
| FE | 03 | 03 | 03 | 01 | 02 | 02 | 03 | 03 | 03 | FF | 03 | 01 | 03 | FF | 01 | 03 | FF | 03 | 03 |
| FF | 03 | 03 | 03 | 01 | 02 | 02 | 03 | 03 | 03 | FF | 03 | 01 | 03 | FF | 01 | 03 | FF | 03 | 03 |

FIG. 20

| i | 01 | 02 | 03 | 04 | 05 | 06 | 07 | 08 | 09 | 0A | 0B | 0C | 0D | 0E | 0F | 10 | 11 | 12 | 13 | 14 | 15 | 16 | 17 | 18 | 19 | 1A | 1B | 1C | 1D | 1E | 1F | 20 | 21 | 22 |
|---|----|----|----|----|----|----|----|----|----|----|----|----|----|----|----|----|----|----|----|----|----|----|----|----|----|----|----|----|----|----|----|----|----|----|
| T(i) | H | O | R | S | E | . | C | A | T | . | C | O | W | . | S | H | E | E | P | . | H | E | N | . | D | O | G | . | M | O | N | K | E | Y |

FIG. 21

| CYCLE | 0 | 1 | 2 | 3 | 4 | 5 | 6 | 7 | 8 | 9 | 10 | 11 | 12 | 13 | 14 | 15 | 16 |
|-------|---|---|---|---|---|---|---|---|---|---|----|----|----|----|----|----|----|
| $z = T(i)$ |   | (R)D9 | (,)6B | (T)E3 | (A)C1 | (C)C3 | (.)6B | (W)E6 | (O)D6 | (C)C3 | (H)C8 | (P)D7 | (E)C5 | (D)C4 | (.)6B | (N)D5 | (Y)E8 |
| $y = S(\ell,z)$ |   | 03 | 03 | FF | FF | 03 | 03 | FF | FF | 05 | 03 | 03 | 03 | 03 | 03 | 03 | 03 |
| $\ell = L(\ell,z)$ | 00 | 00 | 00 | 06 | 07 | 08 | 00 | 01 | 02 | FF | 00 | 00 | 00 | 00 | 00 | 00 | 00 |
| $i = i + y$ | 03 | 06 | 09 | 08 | 07 | 0A | 0D | 0C | 0B | 10 | 13 | 16 | 19 | 1C | 1F | 22 | 25 |
| $OUT = -\ell$ |   |   |   |   |   |   |   |   |   | 01 |    |    |    |    |    |    |    |

METHOD AND APPARATUS FOR RETRIEVAL OF A SEARCH STRING

BACKGROUND OF THE INVENTION

1. Field of the Invention

This invention generally relates to data retrieving techniques, directed to searching for a text or a symbol strip, and to a method and an apparatus for retrieving voice and graphics, and more particularly to a method and an apparatus for data retrieval suitable for high-speed symbol string search processing.

2. DESCRIPTION OF THE PRIOR ART

Typically, this invention may be applied to the field of text searching, and the prior art in this field will be described.

With the recent trend in office automation, storing of document information as data a base has rapidly spread and the size of the data base tends to increase. Accordingly, it is a significant task to speed up data base processing of document information. One of the important types of processing is a text search processing for retrieving a specified character string, called a pattern, from data of character strings called a text. Fast execution of the text search is, therefore, imminently desired.

In the past, various types of text search and apparatus therefor have been proposed. For example, "Hardware Systems for Text Information Retrieval," written by L. A. Hollaar, ACM SIGIR 6th Conf., 1983 describes a cellular array method wherein characters of a pattern are stored in a register one by one in an array, and the pattern is detected by inputting characters of a text to the register one by one starting from the heading character, and a finite state automation method wherein while characters of a text are supplied, starting from the heading character, one by one to a finite state automaton, a pattern is detected by referring to a state transition table. Either of the prior art methods employs character by character supply of the text starting from the heading character, and for a text length of n characters, the inputting of all the n characters has to be done, resulting in an obstacle which in principle prevents faster processing.

Known as approaches on a software basis to text searching, on the other hand, are a KMP method described in "Fast Pattern Matching in Strings", by D. E. Kunuth et al, SIAM J Comput., Vol. 6, pp 323-350, 1977, and a BM method described in "A Fast String Searching Algorithm", by R. S. Boyer et al, CACM, Vol. 20, pp 762-772, 1977. In these approaches, characters of either of a text and a pattern are fetched for comparison one by one, and various kinds of processing are carried out in accordance with the comparison results. Disadvantageously, these approaches are unsuccessful in employing software adaptively for high-speed processing, and also unsuitable for implementation in hardware.

As described above, the prior art methods and approaches face such a problem for an algorithm that all the n characters equivalent to the text length have to be inputted one by one sequentially to detect the pattern.

SUMMARY OF THE INVENTION

An object of this invention is to provide a method and an apparatus for data retrieval which can detect a pattern at a high speed by minimizing the number of characters or symbols of a text which are to be inputted.

To accomplish the above object, according to the invention, tables are prepared for storing information with which an address of a symbol to be subsequently inputted from a symbol string, and a subsequent search state of the symbol string can be readily computed by making reference to a current search state and information representative of at least one inputted symbol, and when a symbol of the symbol string is inputted, the tables are accessed in accordance with the current search state and information representative of the inputted symbol, data stored in the tables are looked up for acquisition of the subsequent search state and the address of the symbol to be subsequently inputted, and a symbol at the acquired address is subsequently inputted, whereby at least one predetermined pattern (a so-called keyword) contained in the symbol string can be detected.

BRIEF DESCRIPTION OF THE DRAWINGS

FIGS. 6 and 7 exemplify tables used in the embodiment of FIG. 1.

FIG. 8 illustrates an example of a text table used in the embodiment of FIG. 1.

FIG. 9 is a table useful in explaining the operation of the FIG. 1 embodiment.

FIG. 14 is a search state table used for symbol string searching.

FIG. 16 is a state transition table used for symbol string searching.

FIG. 17 is a skip table used for symbol string searching.

FIG. 18 is a state transition table used in the embodiment of FIG. 10.

FIG. 19 is a skip table used in the embodiment of FIG. 10.

FIG. 20 is a text table used in the FIG. 10 embodiment.

FIG. 21 is a table for explaining the operation of the FIG. 10 embodiment.

DESCRIPTION OF THE PREFERRED EMBODIMENTS

First Embodiment

A first embodiment of the invention will now be described by referring to text searching, which is a principal, applicable field of the invention. In describing search for a text in accordance with the invention, it is stipulated that the length of a pattern is m and the text length is n, and that the j-th character in the pattern, where $1 \leq j \leq m$, is represented by $P(j)$, a character string ranging from j-th character to k-th character in the pattern is represented by p(j:k), the i-th character in the text, where $1 \leq i \leq n$, is represented by T(i) and a character string ranging from i-th character to k-th character in the text is represented by T(i:k). Also, it is assumed that logics of the text are stored in a random access memory (RAM) in the form of a text table 300 as shown in FIG. 8 and used for execution of the text search.

Figure 3:
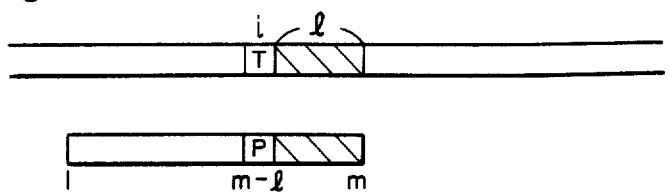
FIGS. 3-5 are diagrams useful in explaining the text search in accordance with the invention.

A current search state of the text is first defined as (i, l), that is, represented by a set of parameters i and l where i is an address of one character to be subsequently inputted of the text and l is the number of characters of the text which coincide with characters of the pattern counted from the trail of the pattern. The search state (i, l) is diagrammatically shown in FIG. 3.

Figure 4:
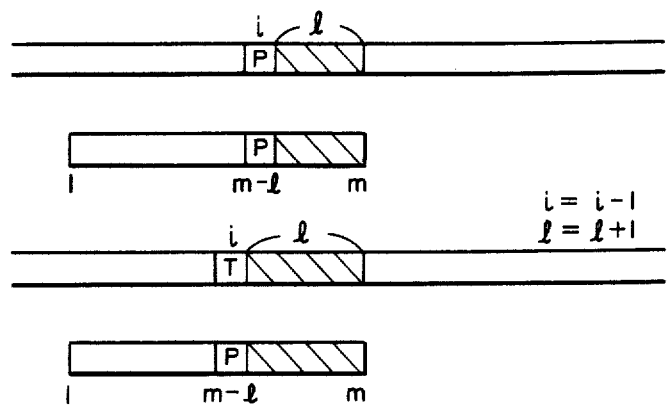
Figure 5:
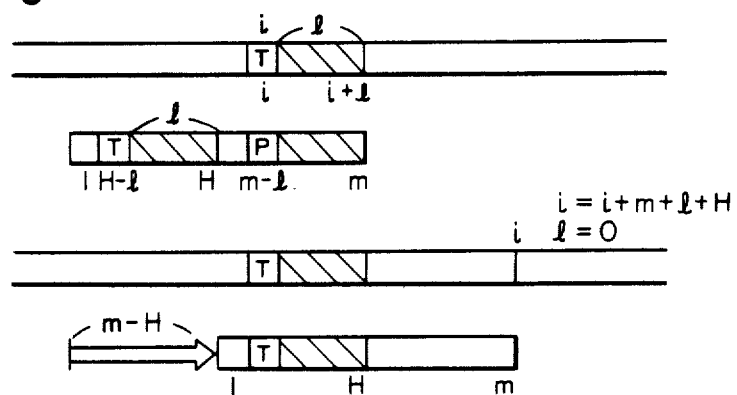

Transition of the search state will then be described with reference to FIGS. 4 and 5. When one text character T(i) of address i to be subsequently inputted under the current search state (i, l) coincides with (m-l)-th pattern character P(l-m), the search state is managed, in accordance with the invention, to shift to a renewed text search state (i−1, l+1), indicating i=i−1 and l=l+1 as shown in FIG. 4. When non-coincident, the pattern is moved until a partial pattern character string preceding the (m-l)-th pattern character P(m-l) exactly coincides with a text character string T(i : i+l) ranging from i-th character to (i+l)-th character. For example, if coincidence is obtained for a character string P(H-l:H) within the pattern, the pattern is ultimately moved by m-H so that the search state may shift to a renewed text search state (i+m+l-H, 0), indicating i=i+m+l-H and l=0 as shown in FIG. 5.

The parameter H as introduced in the above is determined from the following formula:

$$H(l, z) = \max\{x_l(l + 1 \leq x \leq m - 1 \text{ and } P(x - l) = z \text{ and } P(x - l + 1:x) = P(m - l + 1:m)) \text{ or } (1 \leq x \leq l - 1 \text{ and } P(1:x) = P(m - x + 1:m)) \text{ or } x = 0\}$$
$$(1 \leq l \leq m - 1)$$

The H(l, z) is a function which depends only on the pattern. Taking a pattern "AABCAAABCAA", for instance, H(1, C) is representative of a location within the pattern at which a character string "CA" is found for the first time when the pattern character is viewed from the trail of the pattern, the location measuring "10" representative of the final location of the character string. An H(l, z) table 201 used for this instance is illustrated in FIG. 6.

Figure 2:
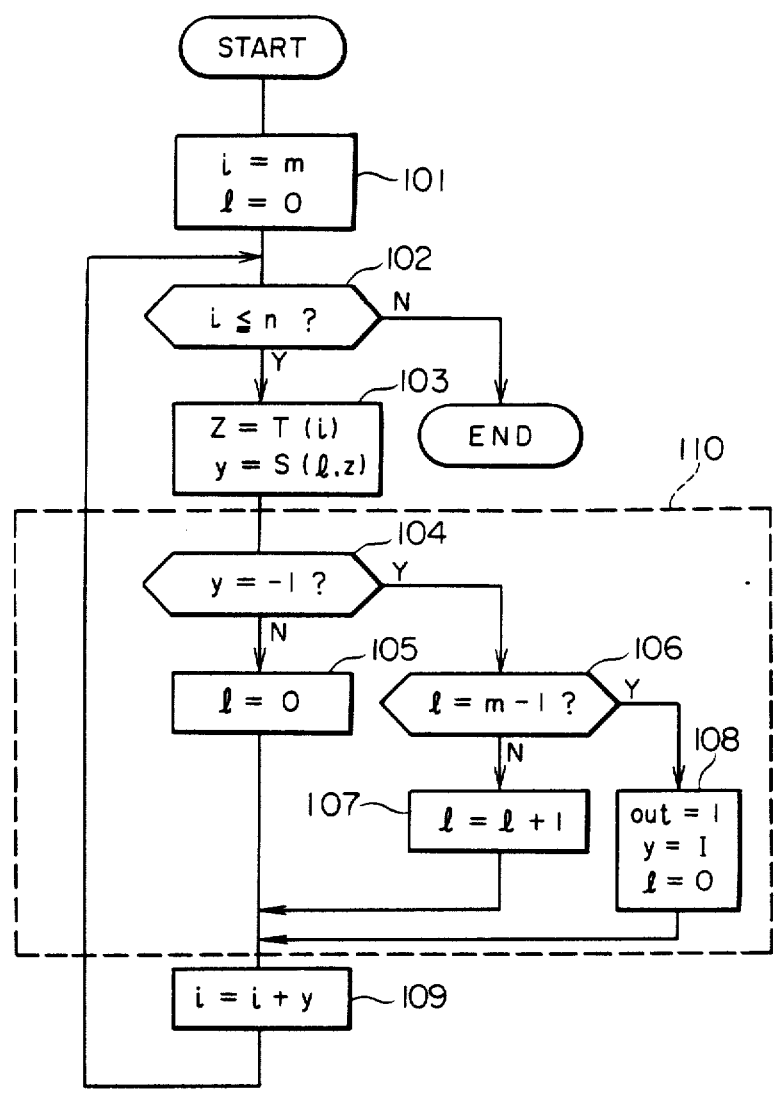
FIG. 2 is a flow chart of text searching in accordance with the invention.

The text search is specifically carried out in accordance with a flow chart as illustrated in FIG. 2. Firstly, the address i of text is set to m representative of the pattern length and the state parameter l is set to 0(zero) (step 101). Then, it is determined whether i is smaller than n, representative of the text length (step 102). If i is larger than n, the text search ends, but if not, the text search continues.

Subsequently, by using i as a parameter, a text table is accessed to input the i-th character T(i) of text which in turn substitutes for z. An S(l, z) table is then looked up by using a set (l, z) of the current state parameter l and inputted text character z as an address to obtain a value which substitutes for y (step 103). The S(l, z) function is defined as, $$S(l, z) = \begin{cases} (m + l - H(l, z)) & \text{if } z \neq P(m - l) \\ -1 & \text{if } z = P(m - l). \end{cases}$$

Thus, the S(l, z) function provides information indicative of a difference between an address to be subsequently inputted of text and the previously inputted address of text. The difference is termed a skip width, and the S(l, z) table will hereinafter be referred to as a skip table. Particularly, it should be understood that when one text character z=T(i) currently examined coincides with P(m−l), the skip width is "−1". As an example, the skip table S(l, z) for a pattern "AABCAAABCAA" is illustrated at 200 in FIG. 7. Turning to the flow chart of FIG. 2, it is determined whether y=S(l, z) is "−1" (step 104). When y is not equal to "−1", the state l is reset to zero (step 105). When y is equal to "−1" indicating that one text character currently examined coincides with one pattern character, the current state parameter l is counted up to l+1 if not being coincident with m−1 (steps 106, 107). But if the current state parameter l is coincident with m−1, indicating that the pattern is found to be in the text, information OUT purporting that the pattern has been found is rendered, for example, "1", the state parameter l is set to "0" and the skip width y is replaced with a constant I=2m−F−1 (step 108), where $$F = \max\{x_l(1 \leq x \leq m \text{ and } P(1:x) = P(m - x + 1:m) \text{ or } x = 0\}.$$

Finally, in consideration of the fact that the skip width y=S(l, z) indicates the difference between the successively inputting text address and a previously inputted text address, i+y substitutes for an address i of text to be subsequently inputted (step 109), and the procedure returns to step 102.

The operation of text searching will be exemplified more specifically with reference to FIG. 9. For example, assume that the text is "AABCAAABABAABC-BAABBAAABAA" as illustrated in FIG. 8 and the pattern is "AABCAAABCAA". For this pattern, the skip table S(l, z) is defined as shown in FIG. 7. Firstly, i=m=11 and l=0 are set. During the first cycle, a text character T(11)=A is inputted, and it substitutes for z. A skip width S(l, z)=S(0, A)=−1 is then fetched, and it substitutes for y. Because of y=−1, the state parameter l is counted up to l=1, and the next address i of text becomes i+y=10. During the second cycle, the 10-th text character T(10)=B is inputted for substitution for z. A skip width y=S(1, B)=11 is fetched. Because of y≠−1, the state parameter l becomes l=0 and the next address i of text becomes i=i+y=21. A similar operation is carried out during the third and fourth cycles; and eventually, the text address i amounts to 30 during the fifth cycle, exceeding n=25, and the text search procedure ends. In this manner, the text search according to this embodiment can ensure that five cycles can suffice to complete the text search procedure for the above-exemplified text of 25 characters, thereby making the processing speed faster as compared to the finite state automaton method and cellular array method in which all of the 25 text characters have to be inputted.

Figure 1:
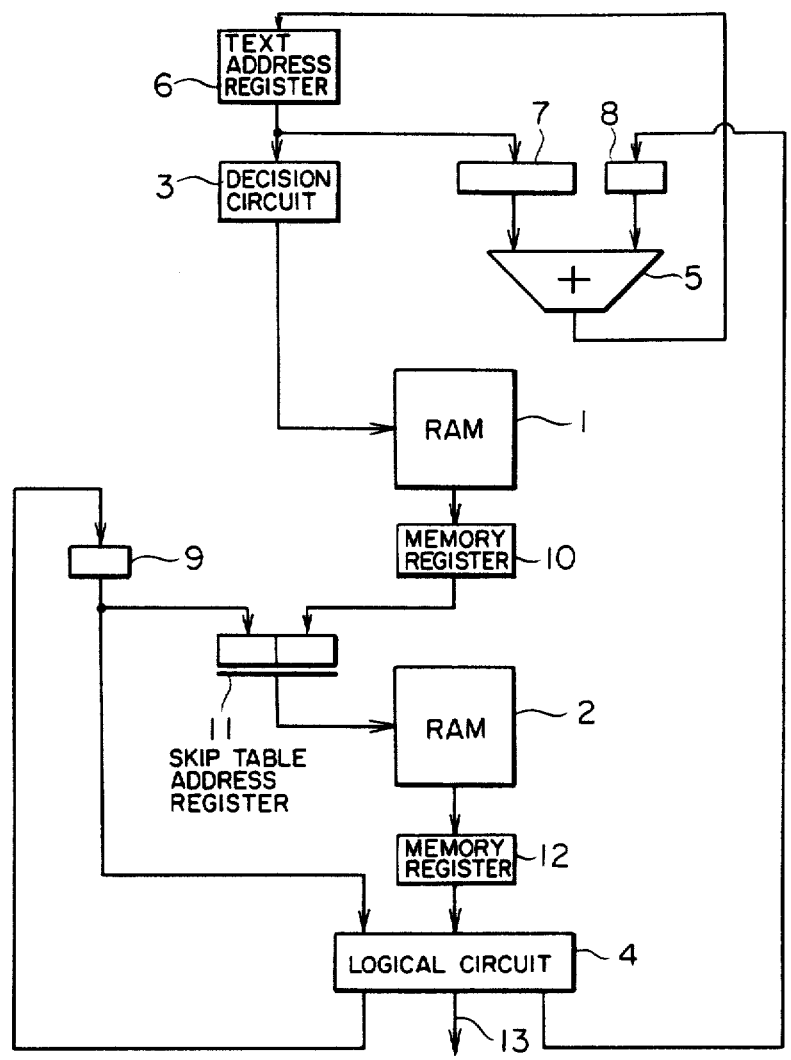
FIG. 1 is a block diagram schematically illustrating a text search apparatus according to an embodiment of the invention.

An example of a circuit arrangement for implementing the text search will now be described with reference to FIG. 1. The circuit arrangement comprises a RAM 1 for storing the text table 300 of text characters T(i), a RAM 2 for storage of the skip table 200 of S(l, z), a text address register 6 adapted for accessing the RAM 1, a skip table address register 11 adapted for accessing the RAM 2, and memory registers 10 and 12 respectively associated with the RAM's 1 and 2. The text address register 6, skip table address register 11, memory register 10 and memory register 12 logically take care of the text address i, skip table address (l, z), text character $z = T(i)$ and skip width $y = S(l, z)$, respectively. Also illustrated in FIG. 1 are a logical circuit 4 for implementation of dotted block 110 in the FIG. 2 flow chart of the text search, an adder 5 for implementing the step 109, and a decision circuit 3 for implementing the step 102. This circuit arrangement operates as described above. Registers 7, 8, 9 may be provided to temporally store data. Numeral 13 denotes the output line.

Although in the foregoing embodiment the tables are looked up in units of one character, it will be easy for those skilled in the art to achieve, as necessary, a modification wherein the tables are looked in units of plural characters. For detection of a plurality of patterns according to teachings of the present invention, the contents such as the kind and number of data of the skip table 200 may be changed accordingly.

As will be seen from the foregoing description, the invention may be implemented on either software or hardware basis.

The symbol strip in the form of a text has been principally referred to in the foregoing embodiment, but the invention may be applied to any of voice pattern, graphics, and figures provided they can be specified in units of retrieval as in the case of the symbol.

According to the first embodiment of the present invention, when the pattern length equals m symbols or characters and the symbol string or text length equals n symbols or characters, the processing can be completed by inputting the symbol or character string of n/m length as a minimum, and therefore the processing performance can be greatly improved as compared to the prior art methods in which all of the n symbols or characters must be inputted. Further, the number of circuit components can be reduced considerably as compared to the prior art method such as the cellular array method.

Second Embodiment

In describing a second embodiment of the invention wherein a symbol string is searched for in terms of a plurality of patterns, algorithm of the symbol string search will first be explained. To this end, it is stipulated that the text length is n, the number of patterns is K, a pattern k has a pattern length $M_k$ where $1 \leq k \leq K$, and the i-th symbol of a text is represented by T(i) where $1 \leq i \leq n$, and the text is stored in a RAM.

Figure 12:
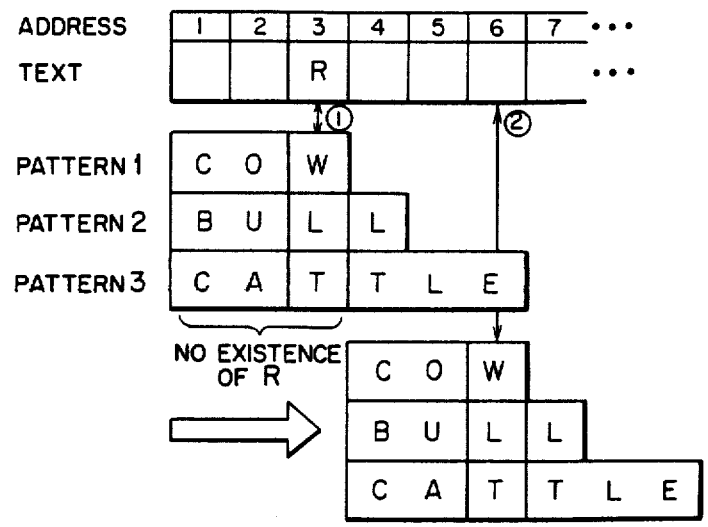
FIGS. 12 and 13 are diagrams useful in explaining the symbol string search in accordance with the invention.
Figure 13:
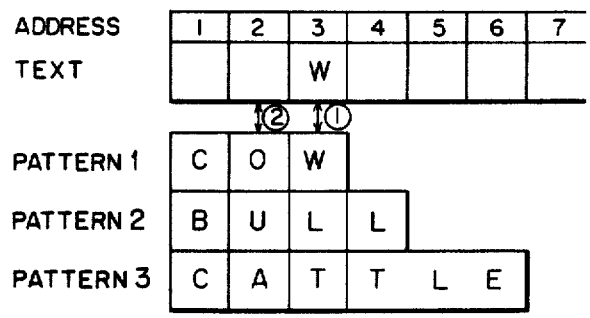

Fundamentally, this algorithm can be interpreted as will be explained below. For example, when three patterns 1, 2 and 3 representative of "COW", "BULL" and "CATTLE", respectively, and a text representative of "HORSE" are taken, non-existence of a symbol "R" in the first to third symbols of any of the three patterns can be proven by merely inputting initially the third symbol $T(3) = $ "R" and therefore it can be confirmed that no pattern exists within the range of from the first to third symbols of the text. Accordingly, it can be well adapted for this instance to consider only the possibility that the patterns exist in the fourth and ensuing symbols of the text (See FIG. 12). This can prevent the first and second symbols "H" and "O" of the text from being inputted in vain and advantageously, the number of symbols to be inputted of the text can be reduced. In this instance, the sixth symbol of the text is determined as a symbol to be subsequently inputted. On the contrary, if the third symbol T(3) is "B", there is the possibility that the pattern 2 of "BULL" coincides with the text, beginning with the third symbol, and this is taken into consideration in proceeding with the search. If the third symbol T(3) is "W", there is the possibility that the first to third symbols of the text correspond to "COW" and hence a symbol immediately ahead of the third symbol, that is, the second symbol T(2) of the text, may conveniently be inputted for examination (See FIG. 13). Fundamentally, the algorithm can be interpreted as above and it can be carried out at high speeds in a manner as described below.

Figure 15:
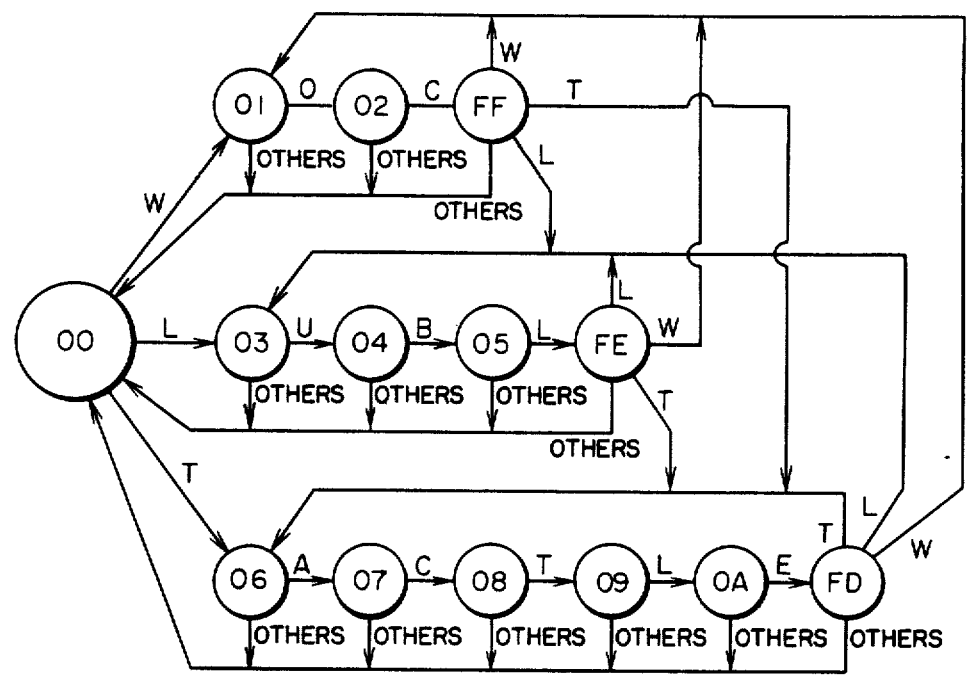
FIG. 15 is a diagram for explaining state transition in accordance with the invention.

In this embodiment, the text search state is designated by l and defined as illustrated in FIG. 14. More particularly, a state "01" purports that the third symbol is "W", a state "02" purports that the second symbol is "O" and the third symbol is "W", and so on. States "FF", "FE" and "FD" respectively purport that the patterns 1, 2 and 3 have been detected. By using the exceptionally numbered states indicative of the patterns detected, pattern detection results can be decided readily. Thus, in this example, the fact that the pattern has been found is indicated when the state goes beyond the state "FD". A state "00" purports inter-symbol non-coincidence and under this state, a symbol z of text corresponding to the third (generally, $1 \leq m \leq K$ ($m_k$)-th) symbol of pattern is inputted. The state "00" shifts to state "01" if the inputted text symbol is "W", to state "03" if "L" and to state "06" if "T". In the other case, the state "00" remains unchanged. Under the state "01", a text symbol z corresponding to the second symbol of pattern is inputted. The state "01" shifts to state "02" if the inputted text symbol is "O" and in the other case, to state "00". The state transition as above is illustrated in a state transition diagram of FIG. 15. This state transition is determined by the current state l and the inputted text symbol z and is illustrated in a state transition table L((, z) of FIG. 16.

When the current state l and one inputted text symbol z are known, a text symbol number to be subsequently inputted is determined by looking up information in a table prepared in advance which is called a skip table S(l, z). For the present example, the skip table is exemplified as illustrated in FIG. 17. The skip table stores the information which indicates a difference between an address of a text symbol to be subsequently inputted and an address of the text symbol previously inputted (the current text symbol) when the current state l and one inputted text symbol z are given. The difference is termed a skip width. For example, if the third text symbol T(3) which is inputted under the state "00" is "R", the address "3" of the current text symbol is added to a skip width S(00, R) = "3" described in the table to provide an address "6" of a text symbol to be subsequently inputted. If the third text symbol T(3) inputted under the state "00" is "W", a skip width S(00, W) = "−1" is referred to, thereby providing an address "2" of a text symbol to be subsequently inputted. By using the state transition table L(l, z) and the skip table S(l, z), the previously described algorithm for symbol string searching can be executed at high speeds.

Figure 11:
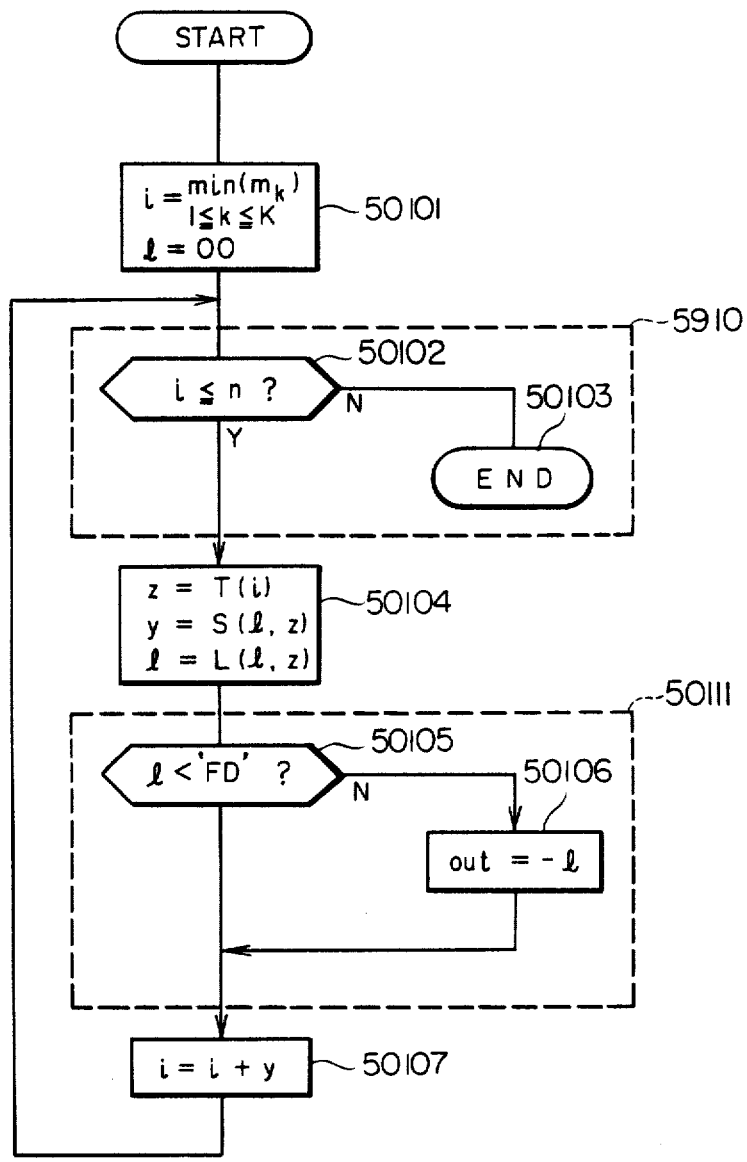
FIG. 11 is a flow chart of symbol string searching in accordance with the invention.

The symbol string search is specifically implemented in accordance with a flow chart of FIG. 11. Firstly, the initial state l=0 and the initial text address, i.e., text symbol address $$i = \min_{1 \leq k \leq K} (m_k)$$

are set (step 50101). Then, depending on whether i≦n stands, it is determined whether the symbol string search should end (step 50102). Unless i≦n, the procedure ends (step 50103). If i≦n, the i-th text symbol z=T(i) is inputted, and in view of the current state l and the inputted symbol z, a subsequent state l=L(l, z) and a skip width y=S(l, z) are fetched (step 50104). By determining whether the subsequently determined state l goes beyond "FD" or not, it is determined which pattern is detected (step 50105). When the "FD" is exceeded, the detected pattern number is −1 and OUT=−1 is set (step 50106). Then, the address i of a text symbol to be subsequently inputted is computed pursuant to i=i+y (step 50107) and the procedure returns to the step 50102.

Figure 10:
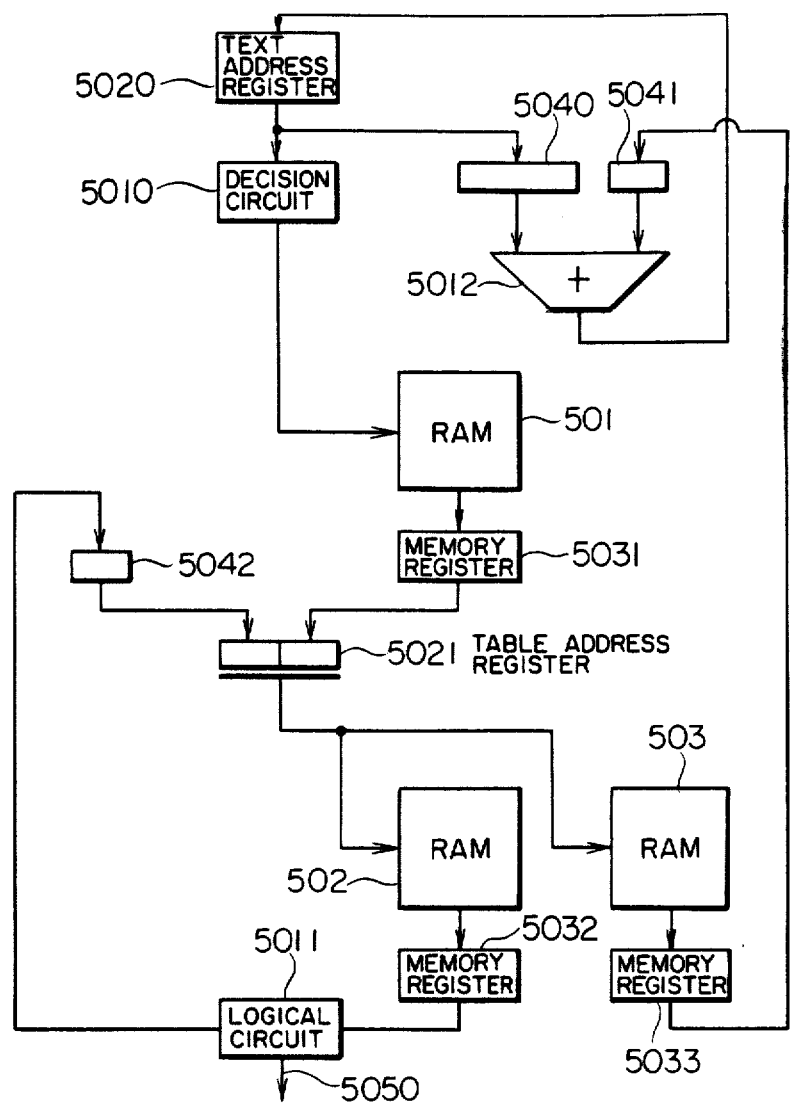
FIG. 10 is a block diagram schematically illustrating a symbol string search apparatus according to another embodiment of the invention.

A circuit arrangement for implementing the symbol string search is exemplarily shown in FIG. 10. The circuit arrangement comprises a RAM 501 for storage of the text table of T(i), a RAM 502 for storage of the state transition table L(l, z), a RAM 503 for storage of the skip table S(l, z), a text address register 5020 adapted for accessing the RAM 501, a table address register 5021 adapted for accessing the RAM's 502 and 503, and memory registers 5031, 5032 and 5033 respectively associated with the RAM's 501, 502 and 503. The text address register 5020, memory register 5031, table address register 5021, memory register 5032 and memory register 5033 logically take care of the text address i, text symbol z=T(i), table address (l, z), subsequent state l=L(l, z) and skip width y=S(l, z), respectively. Also illustrated in FIG. 10 are a decision circuit 5010 for implementation of dotted block 50110 in the FIG. 11 flow chart, a logical circuit 5011 for implementation of dotted block 50111, an adder 5012 for implementation of the step 50107, and an output line 5050 for delivering detected patterns. Registers 5040, 5041 and 5042 may be provided to temporarily store the data.

The operation of this circuit arrangement will be described with reference to FIG. 21. For example, pattern 1 representative of "COW", pattern 2 representative of "BULL", pattern 3 representative of "CATTLE" and a text representative of "HORSE, CAT, COW, SHEEP, HEN, DOG, MONKEY" are taken. In this instance, a text table of T(i) as shown in FIG. 20 is used and stored in the RAM 501. Similarly, a state transition table L(l, z) as shown in FIG. 18 and a skip table S(l, z) as shown in FIG. 19 are used and stored in the RAM's 502 and 503, respectively. Firstly, l="00" is set in the register 5042 and $$i = \min_{1 \leq k \leq K} (m_k) = \text{"03"}$$

is set in the text address register 5020. During the first cycle, a text symbol T(03)="D9" (R) is fetched from the text table into the text register 5031, and then the RAM's 502 and 503 are accessed by referring to "00D9" as an address. Thereafter, state l=L(l, z)="00" and skip width y=S(l, z)="03" are fetched into the state register 5032 and skip width register 5033, respectively.

The logical circuit 5011 examines the contents of the state register 5032, indicating that no pattern is detected because the state does not go beyond "FD". The adder 5012 adds the contents "03" of the skip width register 5033 to the contents "03" of the text address register 5020 and delivers "06" to the text address register 5020. The second cycle is similarly executed. During the third cycle, because of T(09)="E3" (T), the RAM's 502 and 503 are accessed by referring to "00E3" as a table address, and the state l becomes "06" and the skip width y becomes "FF", indicating that the subsequent text address i for the fourth cycle is "08". The procedure continues until the ninth cycle during which the state l becomes "FF" and OUT="01" stands, indicating that the pattern 1 of "COW" has been detected. The procedure further continues until sixteenth cycle during which the symbol strip search ends. In this way, the text search procedure for the symbol strip of 34 symbols, in this example, can be finished through only 16 cycles which contrasts with 34 cycles of processing time of the prior art method.

According to second embodiment of the present invention, when the pattern length of the shortest one of a plurality of patterns equals m and the text length equals n, the search for the symbol string can be completed through n/m cycles as a minimum, and the processing speed can be m times increased as compared to the prior art method which requires n cycles. In addition, the states to the effect that the patterns have been detected are exceptionally numbered to aid in easy determination of the pattern detection results. Further, the number of components of hardware can be reduced considerably as compared to the prior art apparatus based on the cellular array method.

We claim:

1. A process, performed on a digital computer, for retrieving a desired character pattern, containing m contiguous characters, from a text, containing n contiguous characters, where n>m, said process comprising the steps of:

(a) comparing the character at the j-th character location in the desired character pattern, where 1≦j≦m, with the character in the i-th character location in the text, where 1≦i≦n;

(b) determining whether the comparison resulted in a match or in no match;

(c) when step (b) determines that the comparison resulted in no match, comparing the character at the j-th character location in the desired character pattern with the character at the location in the text (m+1−1) character locations after the character location in the text with which the most recent previous comparison was made, where l is the number of comparisons, including said most recent previous comparison, that have been made and have resulted in a match since that most recent comparison which resulted in no match, and repeating the process from step (b);

(d) when step (b) determines that the comparison resulted in a match and when no comparison has yet resulted in a match of the m-th character in the desired character pattern, then comparing the character in the next character location in the desired character pattern with the character in the next character location in the text and repeating the process from step (b); and (e) when step (b) determines that the comparison resulted in a match and any comparison has resulted in a match of the m-th character in the desired character pattern, then comparing the character at the character location in the desired character pattern next preceding the character location in the desired character pattern with which the most recent previous comparison was made with the character at the character location in the text next preceding the character location in the text with which said most recent previous comparison was made, and repeating the process from step (b) until the desired character pattern is retrieved from the text.

2. A process, performed on a digital computer, for retrieving a desired character pattern, made up of a plurality of characters in contiguous character locations, from a character pattern table containing a plurality of character patterns, each character pattern of the plurality of character patterns made up of a plurality of characters in contiguous character locations, the method utilizing a state transition table containing indications of the state of a comparison of characters and a skip table containing indications of a number of contiguous characters to be skipped and the direction of such skip, said method comprising the steps of:

(a) identifying the present comparison state as an initial comparison state;

(b) comparing the character at a selected present character location in the desired character pattern with the character at a corresponding character location in the character pattern table;

(c) determining whether the comparison resulted in a match or in no match;

(d) when step (c) determines that the comparison resulted in no match, then (1) accessing a location of the state transition table corresponding to no match in the present comparison state to determine a new present comparison state, (2) accessing a location of the skip table corresponding to the new present comparison state to determine a number of contiguous characters to be skipped and the direction of such skip, (3) skipping from the present character location in the character pattern table the determined number of contiguous characters in the determined direction, (4) comparing the character at the selected with the character at the so located new present character location in the character pattern table, and (5) repeating the process from step (c);

(e) when step (c) determines that the comparison resulted in a match, then (1) accessing a location of the state transition table corresponding to a match in the present comparison state to determine a new present comparison state, (2) accessing a location of the skip table corresponding to the new present comparison state to determine a number of contiguous characters to be skipped and the direction of such skip, (3) skipping from the present character location in both the desired character pattern and the character pattern table the determined number of contiguous characters in the determined direction, (4) comparing the characters at the so located new present character locations, and (5) repeating the process from step (c) until the new comparison state indicates that the desired character pattern has been located in the character pattern table.

3. Apparatus for retrieving a desired character pattern, containing m characters in contiguous character locations, from a text, containing n characters in contiguous character locations, where $n > m$, said apparatus comprising:

means for storing the text;

comparison means for comparing characters applied thereto;

means for applying the j-th character of the desired character pattern to said comparison means, where $1 \leq j \leq m$;

means for applying the i-th character in the text to said comparison means, where $1 \leq i \leq n$;

means responsive to said comparison means determining no match between characters applied thereto for applying to said comparison means the character in the text $(m+1-1)$ character locations after the character location in the text with which the most recent previous comparison was made, for comparison with the j-th character of the desired character pattern, where l is the number of comparisons, including said most recent previous comparison, that have been made and have resulted in a match since that most recent comparison which resulted in no match;

means responsive to said comparison means determining a match between characters applied thereto, when no comparison by said comparison means has yet resulted in a match of the m-th character in the desired character pattern, for comparing the character at the next character location in the desired character pattern with the character at the next location in the text;

means responsive to said comparison means determining a match between characters applied thereto when any previous comparison by said comparison means has resulted in a match of the m-th character in the desired character pattern for applying to said comparison means the character at the character location in the desired character pattern preceding the character location in the desired character pattern with which the most recent previous comparison was made and the character at the character location in the text next preceding the character location in the text with which said most recent previous comparison was made for comparison therebetween; and means for indicating that the desired character pattern has been retrieved from the text.

4. Apparatus for retrieving a desired character pattern, made up of a plurality of characters in contiguous character locations, from a character pattern table containing a plurality of character patterns, each character pattern of the plurality of character patterns made up of a plurality of characters in contiguous character locations, said apparatus comprising:

input means for receipt of the desired character patterns;

means for storing the character pattern table;

means for storing a state transition table containing indications of the state of a comparison of characters;

means for storing a skip table containing indications of a number of contiguous characters in a character pattern to be skipped and the direction of such skip;

means for indicating whether a comparison resulted in a match or in no match;

means for comparing the character at a selected present character location in the desired character pattern with the character at the corresponding character location in the character pattern table and applying the results of such comparison to said indicating means;

means responsive to an indication of no match for accessing a location of the state transition table corresponding to no match in the present comparison state to determine a new present comparison state, (b) accessing a location of the skip table corresponding to the new present comparison state to determine a number of contiguous characters to be skipped and the direction of skip, (c) comparing the character at the selected present character location in the desired character pattern with the character at the location in the character pattern table found by skipping from the present character location in the character pattern table the determined number of contiguous characters in the determined direction to a new present character location, and (d) applying the results of such comparison to said indicating means; and means responsive to an indication of a match for (a) accessing a location of the state transition table corresponding to a match in the present comparison state to determine a new present comparison state, (b) accessing a location of the skip table corresponding to the new comparison state to determine a number of contiguous characters to be skipped and the direction of such skip, (c) comparing the characters at the locations in the desired character pattern and in the character pattern table found by skipping from the present character locations the determined number of contiguous characters in the determined direction to new present character locations in both the desired character pattern and the character pattern table, and (d) determining whether the new comparison state indicates that the desired character pattern has been located in the character pattern table, and if not then applying the results of such comparison to said indicating means.

* * * * *